Patented Mar. 16, 1948

2,437,796

UNITED STATES PATENT OFFICE

2,437,796

PROCESS FOR MAKING ORGANIC PHOSPHORUS HALIDES

Cheves Walling, Montclair, N. J., assignor to E. I. du Pont de Nemours & Company, Wilmington, Del., a corporation of Delaware No Drawing. Application July 13, 1944, Serial No. 544,836

7 Claims. (Cl. 260—607)

This invention relates to new processes for manufacturing organic trivalent phosphorus dihalides.

It is known that substituted organic phosphines react directly with the halogens and that such reactions heretofore reported are in general violent and lead to oxidation or other extreme chemical activity which produces pentavalent phosphorus compounds. Organic phosphorus compounds of the type $RPX_2$ wherein X represents halogen and phosphorus is trivalent have been desired as reactants for carrying out various kinds of syntheses, but heretofore primary organic phosphorus halides have not been satisfactorily produced in so far as I am aware.

It is among the objects of the present invention to provide new processes for making organic phosphorus halides which are represented in general by the formula $RPX_2$, wherein phosphorus is trivalent, X represents halogen and R represents one of a group consisting of the radicals of the saturated aliphatic, aralkyl and carbocyclic series. Other objects of the invention will be apparent from the following description.

The objects of the invention are attained in general by reacting a phosphine represented by the formula $RPH_2$, wherein R is one of a group of monovalent radicals consisting of the saturated aliphatic, aralkyl and carbocyclic series, with a halogen in an inert medium.

The invention will be more fully set forth in the following more detailed description which includes examples that are given as illustrative embodiments of the invention and not as limitations thereof. Parts are expressed in parts by weight unless otherwise noted.

Example I

The reaction was carried out in a closed reaction vessel which was provided with a reflux condenser, an inlet for introducing an inert gas over the reaction mixture and means to vent excess gas. To 45 parts of butyl phosphine ($C_4H_9PH_2$) dissolved in 200 parts of dry chloroform and stirred under an atmosphere of nitrogen, 130 parts of bromine dissolved in 150 parts of chloroform were gradually introduced during the course of an hour. The temperature was maintained just below 20° C. by suitable cooling, the variation in temperature below 20° C. during the reaction being not more than about 10° C. Hydrogen bromide was evolved and vented with some of the nitrogen, and towards the end of the reaction a white precipitate was formed. The chloroform was then distilled off and the white precipitate was filtered out. The filtrate containing butyl phosphorus dibromide was fractionally distilled in vacuo and 55 parts of butyl phosphorus dibromide were obtained. (B. P. 80°–95° C. at 10 mm.). The product is a clear liquid, fuming somewhat in air, and having the following analysis: Br 65.7% P 12.2%. The product is represented by the formula $(C_4H_9)PBr_2$.

The n-butyl phosphine may be prepared by heating butyl iodide, phosphonium iodide and zinc oxide together at 140° in a sealed tube.

By using 58 parts of cyclohexyl phosphine, or 55 parts of phenyl phosphine or 62 parts of benzyl phosphine instead of 45 parts of butyl phosphine in the process of the foregoing example, cyclohexyl phosphorus dibromide, phenyl phosphorus dibromide or benzyl phosphorus dibromide are produced.

By using an equivalent proportion of chlorine dissolved in chloroform instead of 130 parts of bromine in the foregoing example, the corresponding butyl phosphorus di-chloride is made. In like manner, the corresponding di-iodide may be produced by using an equivalent amount of iodine dissolved in chloroform instead of the bromine.

Any organic phosphine having two replaceable hydrogens directly connected to the trivalent phosphorus can be used in the process wherein the organic radical is one of the group consisting of the saturated aliphatic, aralykyl and carbocyclic series. Any of the radicals may be inertly substituted but should be devoid of active groups. Active groups are substituents which react with halogen or phosphorus halides in the reaction medium employed. Inert substituents are substituents such as fluorine chlorine, bromine, iodine, nitro, —NHCOR, —OR, —SR and —SO$_2$R, wherein R has the value hereinbefore defined. Among the many suitable phosphines which can be used in accordance with the invention and from which the corresponding halides are produced in accordance with the processes herein disclosed are methyl-, ethyl-, isopropyl-, n-butyl-, octadecyl-, benzyl-, cyclohexyl-, p-tolyl-, alpha naphthyl-, beta-phenoxy ethyl-, beta-acetylamino-ethyl-, para iodophenyl- and meta-nitrophenyl-phosphines.

The reaction may be conducted at any temperature as high as the refluxing temperature of the reaction mixture and as low as any temperature that the inert solvent is liquid. Reaction temperatures not higher than ordinary room temperatures, say 25° C., favor higher yields and are preferred. Any mutual inert liquid organic solvent for the organic phosphine and the halogen can be used which is liquid at the reaction temperature. It can be selected from a considerable number of such solvents, such as benzene, carbon tetrachloride, ortho-chlorobenzene and ethylene dichloride. The term, inert liquid organic solvent, in the specification and claims refers to any organic solvent in which the organic phosphine and the halogen are both soluble, which is liquid at the reaction temperature and which does not react materially with the constituents of the reaction mixture or product to form undesired compounds. It is preferable to have a slight deficiency of the halogen in the reaction mixture under that which is required to react with all of the hydrogen which is substituted on the phosphorus to avoid the formation of compounds containing more halogen than that which replaces the hydrogen, but equimolecular proportions or even a small excess of halogen may be used.

Instead of adding the halogen to the reaction mixture in the form of a solution in a liquid organic solvent, it may be added as a gas or as a mixture of the halogen and a gas which is non-reactive in the reaction mixture, such as a mixture of the gaseous halogen and nitrogen or a vapor of the halogen. When halogen is introduced into the reaction mixture in the form of a gas, it is frequently desirable to use a mixture of the halogen and a non-reactive gas, especially when the more chemically reactive halogens are used, such as chlorine. A mixture of gaseous halogen and any gas which is non-reactive in the reaction mixture can be used to the same effect in the process described in Example I, instead of a solution of the halogen in chloroform, or a part of the halogen can be introduced into the reaction mixture in the form of a solution in an inert solvent and part in the form of a gas.

From the foregoing disclosure it will be recognized that the invention is susceptible of modifications without departing from the spirit and scope thereof and it is to be understood that the invention is not restricted to the specific illustrations thereof herein set forth.

I claim:

1. The process which comprises dissolving in an inert liquid organic solvent an organic phosphine represented by the formula $RPH_2$, wherein R is a member of the group consisting of alkyl radicals of 1 to 18 carbon atoms, benzyl, cyclohexyl, phenyl, tolyl and naphthyl radicals and the corresponding inertly substituted radicals in which said inert substituent is selected from the group consisting of fluorine, chlorine, bromine, iodine, nitro, —NHCOR, —OR, —SR and —$SO_2R$, wherein R has the meaning hereinbefore defined, adding sufficient of a halogen selected from the group consisting of chlorine, bromine and iodine to replace hydrogen attached to the phosphorus of said phosphine, and maintaining a temperature at least as high as the temperature at which the reaction medium is liquid and not higher than the refluxing temperature of the medium, until said hydrogen which is attached to the trivalent phosphorus is replaced by the halogen.

2. The process in accordance with claim 1 in which the organic radical is a saturated aliphatic radical.

3. The process in accordance with claim 1 in which the reaction is carried out at a temperature below the refluxing temperature of the reaction mixture.

4. The process in accordance with claim 1 in which the reaction temperature is not higher than about 25° C.

5. The process in accordance with claim 1 in which the halogen is bromine and the reaction temperature is not higher than about 25° C.

6. The process in accordance with claim 1 in which the halogen is chlorine and the reaction temperature is not higher than about 25° C.

7. The process in accordance with claim 1 in which the halogen is iodine and the reaction temperature is not higher than about 25° C.

CHEVES WALLING.

REFERENCES CITED

The following references are of record in the file of this patent:

Richter, Organic Chemistry, translated by Spielmann, 2nd ed., pages 173–174.

Fieser, Organic Chemistry, 1944, page 32.

Certificate of Correction

Patent No. 2,437,796.   March 16, 1948.

CHEVES WALLING

It is hereby certified that errors appear in the printed specification of the above numbered patent requiring correction as follows: Column 2, line 31, for "aralykyl" read *aralkyl*; column 3, lines 42 and 43, for the word "modifications" read *modification*; and that the said Letters Patent should be read with these corrections therein that the same may conform to the record of the case in the Patent Office.

Signed and sealed this 11th day of May, A. D. 1948.

[SEAL]

THOMAS F. MURPHY,
*Assistant Commissioner of Patents.* solvent for the organic phosphine and the halogen can be used which is liquid at the reaction temperature. It can be selected from a considerable number of such solvents, such as benzene, carbon tetrachloride, ortho-chlorobenzene and ethylene dichloride. The term, inert liquid organic solvent, in the specification and claims refers to any organic solvent in which the organic phosphine and the halogen are both soluble, which is liquid at the reaction temperature and which does not react materially with the constituents of the reaction mixture or product to form undesired compounds. It is preferable to have a slight deficiency of the halogen in the reaction mixture under that which is required to react with all of the hydrogen which is substituted on the phosphorus to avoid the formation of compounds containing more halogen than that which replaces the hydrogen, but equimolecular proportions or even a small excess of halogen may be used.

Instead of adding the halogen to the reaction mixture in the form of a solution in a liquid organic solvent, it may be added as a gas or as a mixture of the halogen and a gas which is non-reactive in the reaction mixture, such as a mixture of the gaseous halogen and nitrogen or a vapor of the halogen. When halogen is introduced into the reaction mixture in the form of a gas, it is frequently desirable to use a mixture of the halogen and a non-reactive gas, especially when the more chemically reactive halogens are used, such as chlorine. A mixture of gaseous halogen and any gas which is non-reactive in the reaction mixture can be used to the same effect in the process described in Example I, instead of a solution of the halogen in chloroform, or a part of the halogen can be introduced into the reaction mixture in the form of a solution in an inert solvent and part in the form of a gas.

From the foregoing disclosure it will be recognized that the invention is susceptible of modifications without departing from the spirit and scope thereof and it is to be understood that the invention is not restricted to the specific illustrations thereof herein set forth.

I claim:

1. The process which comprises dissolving in an inert liquid organic solvent an organic phosphine represented by the formula $RPH_2$, wherein R is a member of the group consisting of alkyl radicals of 1 to 18 carbon atoms, benzyl, cyclohexyl, phenyl, tolyl and naphthyl radicals and the corresponding inertly substituted radicals in which said inert substituent is selected from the group consisting of fluorine, chlorine, bromine, iodine, nitro, —NHCOR, —OR, —SR and —$SO_2R$, wherein R has the meaning hereinbefore defined, adding sufficient of a halogen selected from the group consisting of chlorine, bromine and iodine to replace hydrogen attached to the phosphorus of said phosphine, and maintaining a temperature at least as high as the temperature at which the reaction medium is liquid and not higher than the refluxing temperature of the medium, until said hydrogen which is attached to the trivalent phosphorus is replaced by the halogen.

2. The process in accordance with claim 1 in which the organic radical is a saturated aliphatic radical.

3. The process in accordance with claim 1 in which the reaction is carried out at a temperature below the refluxing temperature of the reaction mixture.

4. The process in accordance with claim 1 in which the reaction temperature is not higher than about 25° C.

5. The process in accordance with claim 1 in which the halogen is bromine and the reaction temperature is not higher than about 25° C.

6. The process in accordance with claim 1 in which the halogen is chlorine and the reaction temperature is not higher than about 25° C.

7. The process in accordance with claim 1 in which the halogen is iodine and the reaction temperature is not higher than about 25° C.

CHEVES WALLING.

REFERENCES CITED

The following references are of record in the file of this patent:

Richter, Organic Chemistry, translated by Spielmann, 2nd ed., pages 173–174.

Fieser, Organic Chemistry, 1944, page 32.

Certificate of Correction

Patent No. 2,437,796. March 16, 1948.

CHEVES WALLING

It is hereby certified that errors appear in the printed specification of the above numbered patent requiring correction as follows: Column 2, line 31, for "aralykyl" read *aralkyl*; column 3, lines 42 and 43, for the word "modifications" read *modification*; and that the said Letters Patent should be read with these corrections therein that the same may conform to the record of the case in the Patent Office.

Signed and sealed this 11th day of May, A. D. 1948.

[SEAL]

THOMAS F. MURPHY,
*Assistant Commissioner of Patents.*